United States Patent Office 3,317,135
Patented May 2, 1967

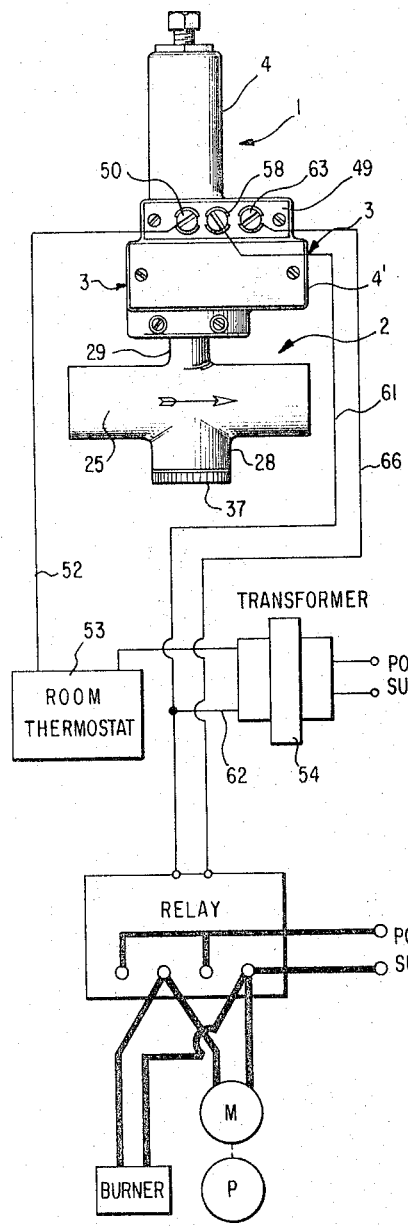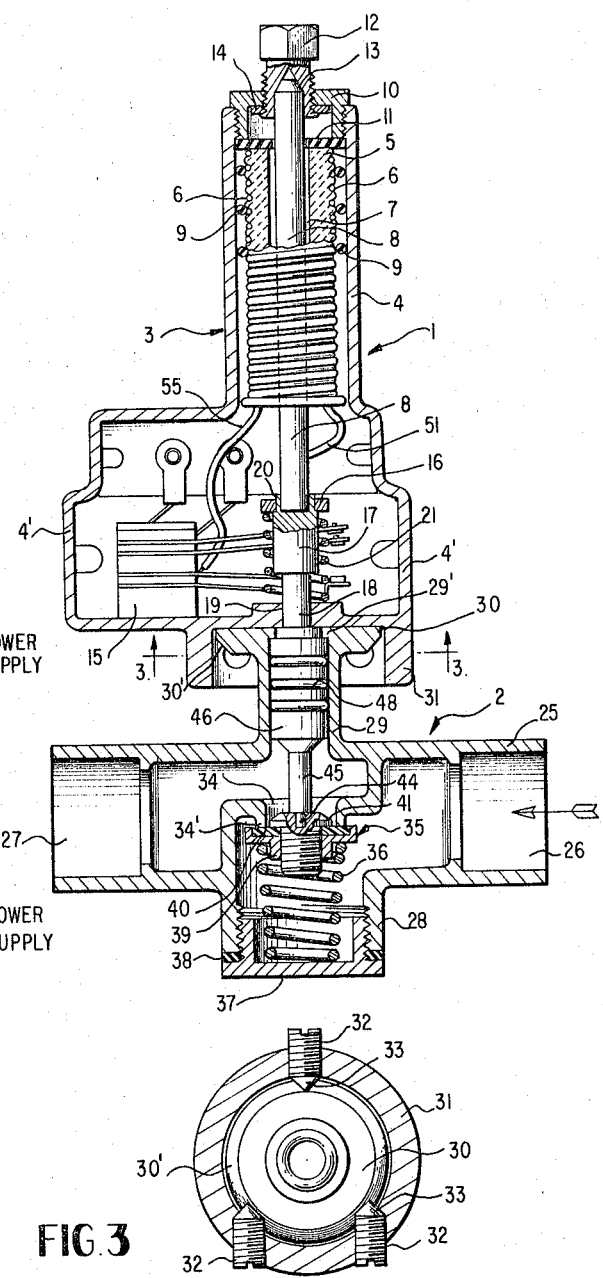

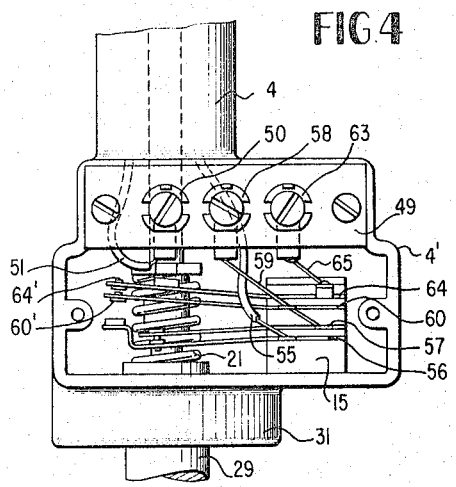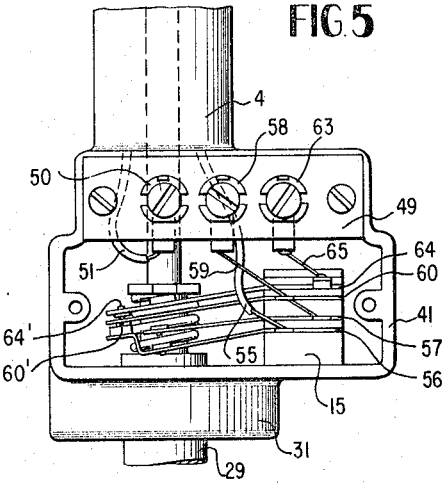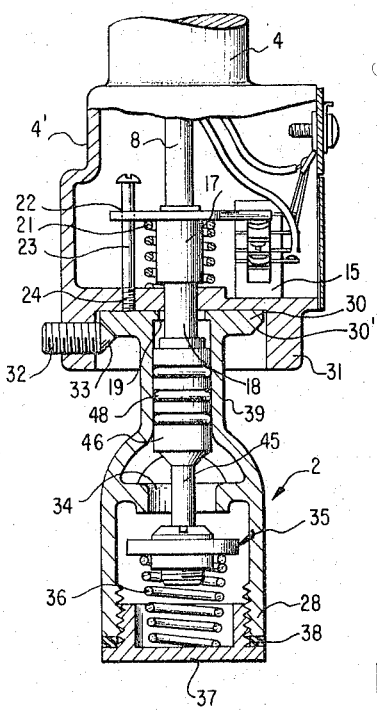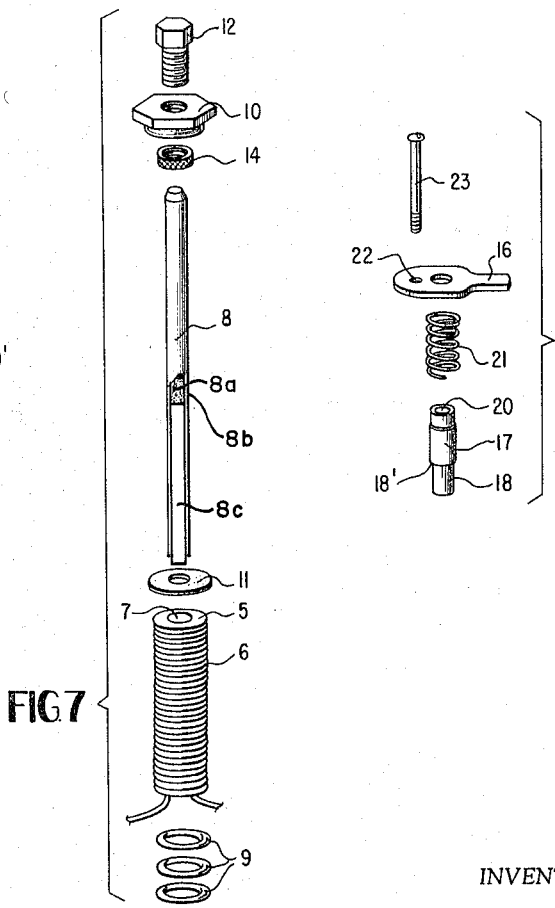

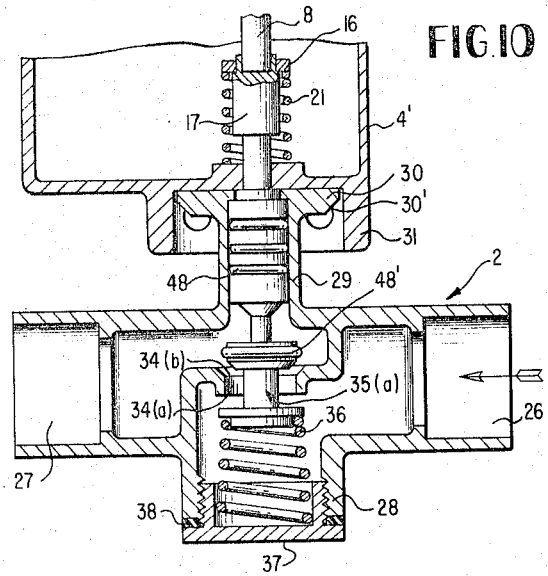
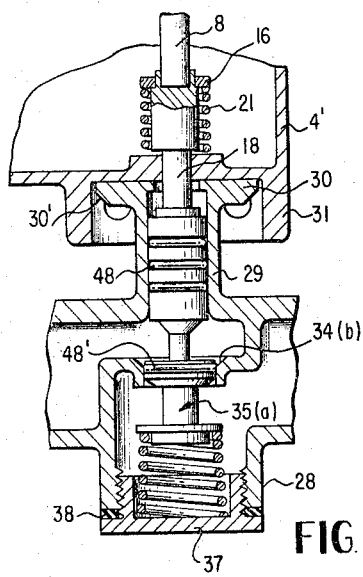
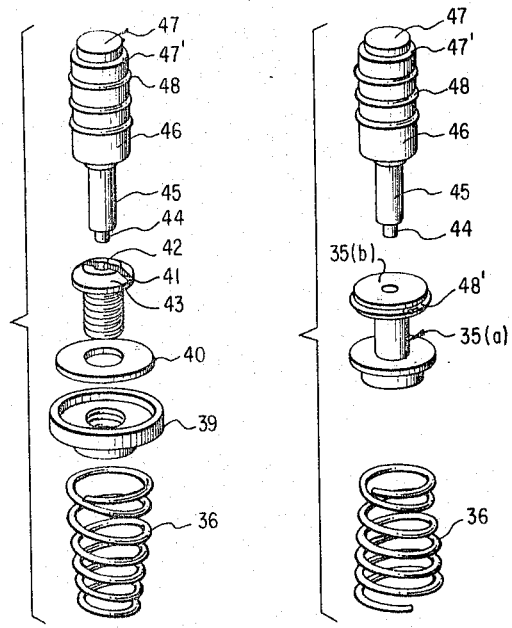
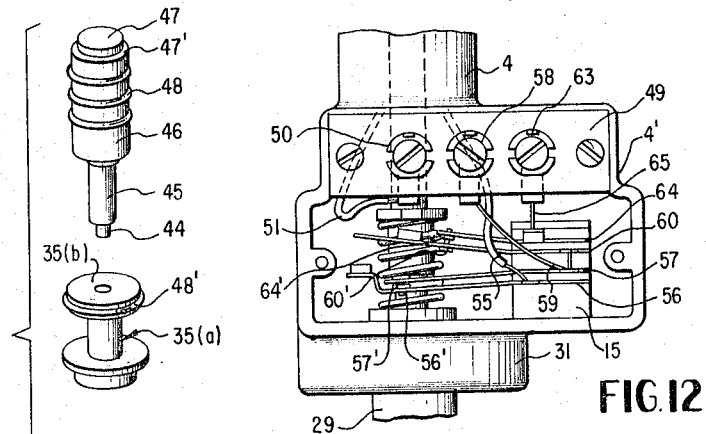
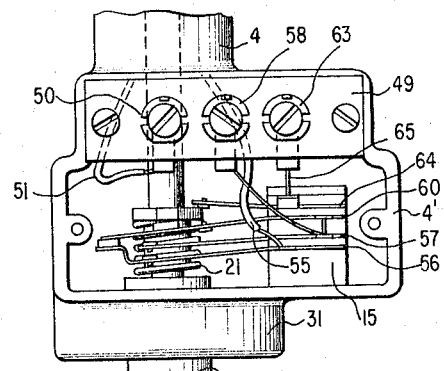

3,317,135
ELECTRICALLY CONTROLLED THERMOSENSITIVE ACTUATORS FOR REMOTE CONTROL OF VALVES AND OTHER DEVICES
Maurice Feinberg, 2 Jackson St., Waltham, Mass. 02154
Filed Sept. 17, 1963, Ser. No. 309,566
16 Claims. (Cl. 236—68)

This invention relates to an electrically controlled thermosensitive actuator incorporating an expandable heat sensitive plastic, and more particularly, to an electrically controlled thermosensitive actuator for remote control of valves or other devices.

Heretofore, actuation of conventional remote controlled valves has been accomplished by means of motors of various types incorporating reduction gears, linkage arrangements, diaphragms, and similar devices, arranged and interconnected with time control means, thermostats, or the like whereby, upon completion of a predetermined time cycle or change in temperature, the motor actuates the valve to desired position. While valve actuation means of the aforementioned type no doubt function for their intended purposes, they are open to objection because of malfunctioning and other operational difficulties inherent in their design.

The improved electrically controlled thermosensitive actuator of the present invention, employed in connection with the remote control of valves, comprises essentially, a power head assembly, including an electrically controlled thermosensitive actuator incorporating an expandable heat sensitive plastic, a valve body assembly having a port through which the medium to be controlled flows, a valve piston incorporating a stem having a valve head associated therewith adapted to seat in the valve port and seal the same, the thermosensitive actuator being constructed and arranged to actuate the valve piston upon completion of electrical circuits through the medium of switch means associated therewith.

An object of my invention is to provide an improved electrically controlled thermosensitive actuator.

Another object of my invention is to provide an improved electrically controlled thermosensitive actuator incorporating an expandable, heat sensitive plastic.

Still another object of my invention is to provide an electrically controlled thermosensitive actuator incorporating an expandable, heat sensitive plastic for use in connection with the remote control of valves or other devices.

Yet another object of my invention is to provide an improved electrically controlled thermosensitive actuator characterized by accurate control and dependable operation.

A further object of my invention is to provide an improved electrically controlled thermosensitive actuator for the remote control of valves, said actuator having improved responsive action whereby valve chattering and hammering are eliminated.

A still further object of my invention is to provide an improved electrically controlled thermosensitive actuator for the remote control of valves, characterized by simplicity of installation, and requiring minimum maintenance.

Yet a further object of my invention is to provide an improved electrically controlled thermosensitive actuator for the remote control of valves which is strong and sturdy in construction, consisting of relatively few parts not liable to get out of order even after long and continued use.

With these and other objects in view, which may be incident to my improvements, the invention consists in the parts and combinations to be hereinafter set forth and claimed, with the understanding that the several necessary elements, comprising my invention, may be varied in construction, portions and arrangements, without departing from the spirit and scope of the appended claims.

In order to make my invention more clearly understood, I have shown in the accompanying drawings means for carrying the same into practical effect, without limiting the improvements in their useful application and to the particular construction, which for purposes of explanation, have been made the subject of illustration.

In the drawings:

FIGURE 1 is an elevational view of the electrically controlled thermosensitive actuator of the present invention operatively connected to a valve, including a wiring diagram;

FIG. 2 is a vertical sectional view of the actuator and valve of FIG. 1, showing the valve in closed position;

FIG. 3 is a sectional view on line 3—3 of FIG. 2, showing means for securing the valve body to the power head casing;

FIG. 4 is a fragmentary elevational view of the opposite side of the actuator and valve of FIG. 2, with cover plate removed, showing the switch in de-energized position;

FIG. 5 is a view similar to FIG. 4, showing the switch in energized position;

FIG. 6 is a transverse fragmentary sectional view of the power head and valve assembly of FIG. 2, showing the valve in open position;

FIG. 7 is an exploded perspective view of the power element assembly;

FIG. 8 is an exploded perspective view of the switch actuator and limiting device assembly;

FIG. 9 is an exploded perspective view of the valve assembly of FIG. 2;

FIG. 10 is a fragmentary vertical sectional view of a modification of the actuator and valve arrangement of FIG. 2, wherein the valve, which is normally open, is energized to closed position;

FIG. 11 is a view similar to FIG. 10, showing the valve in closed position;

FIG. 12 is a fragmentary elevational view of one side of the power head, with cover plate removed, showing the stack switch in de-energized position;

FIG. 13 is a view similar to FIG. 12, showing the stack switch in energized position; and FIG. 14 is an exploded perspective view of the valve assembly of the embodiment of the invention shown in FIG. 10.

Referring to the drawings, and more particularly to FIGS. 1 and 2, the improved electrically controlled thermosensitive actuator, employed for the remote control of valves, comprises a power head assembly 1 detachably connected to a valve assembly 2, said power head assembly comprising a housing 3 having an upper portion 4 and a lower portion 4'. An electrical heater comprising a ceramic core 5 having a heating coil 6 wound thereon is mounted within the upper portion of the housing, said core being formed with an axial bore 7 to receive a power element 8. The ceramic core is insulated from and supported in spaced relation with respect to the inner wall of the housing by means of suitable O-ring insulators 9. The upper end portion of the housing is closed by means of a cap 10 threadable therein, said cap being insulated from the electrical heater by means of a silicone washer 11. A plug 12, having a central recessed portion 13, adapted to receive the upper end of the power element 8, is threaded into the cap 10, as shown, the plug having a flange 14 of greater diameter than the threaded opening in the cap, whereby to limit outward movement of the plug with respect to the cap.

By means of the construction and arrangement of the cap and plug assembly the normal, thermal actuation of the power element can be manually duplicated.

Mounted within the lower portion 4' of the housing is stack switch 15, and a switch actuating arm 16 (FIGS. 6 and 8) secured to the upper end portion of a plunger 17 having a reduced lower end portion 18 slidably received in an aperture 19 formed in the bottom wall of the housing. The upper end of the plunger is formed with a central recess 20 adapted to receive the lower end of the power element 8, said power element and actuating arm being biased upwardly by means of a spring 21 interposed between the bottom wall of the housing and the switch actuating arm in concentric relation with respect to the plunger. The switch actuating arm 16 is provided with an aperture 22 to slidably receive a bolt 23 threadable into the bottom of the housing as at 24, the bolt functioning to prevent rotation of the switch actuating arm, whereby the arm is maintained in desired operative position with respect to the stack switch 15 during the reciprocatory movement of the plunger. The bolt head provides stop means to limit upward movement of the actuating arm; downward movement thereof together with the plunger 17, being limited by shoulder 18' defined by the reduced end portion 18 of the plunger.

Reference being had to FIGS. 2 and 6, it will be observed that the valve assembly 2 comprises a valve body or casing 25 having an inlet port 26 and an outlet port 27, a lower extension or boss 28, and an upstanding portion 29 concentric with said lower extension, the portion 29 being formed with an internal flange 29' and an external flange 30, the latter being adapted to seat within a hub member 31 formed on the bottom of the lower portion 4' of the power head assembly. The flange 30, which is formed with a bevelled peripheral surface 30' is secured within the hub 31 by means of set screws 32 having conical shaped end portions 33, the taper of said end portions being the same as the inclination of the bevelled portion of the flange. By means of this construction, the power head assembly and the valve body assembly are drawn tightly together and maintained in proper operating position, and additionally, this unique mounting arrangement not only facilitates installation and removal of the power head assembly from the valve body but also permits the power head to be installed in any desired position on the valve body.

The valve body is further provided with a valve port 34 having a seat 34' controlled by a valve member 35 which is normally biased into closed, seated position by means of a frusto-conical shaped coil spring 36 having its smaller base abutting a cap member 37 threaded into the boss 28, and sealed against leakage by means of a gasket 38 formed from neoprene, asbestos or other suitable material.

The valve member 35 (FIGS. 2 and 9) comprises a washer cup 39, a suitable washer 40, a washer retainer and guide member 41 threadable into the washer cup, said washer retainer having a recess 42 formed in its head portion 43 adapted to receive the tip 44 of a valve stem 45, said head portion being provided with a tapered surface which functions as a centering guide to insure proper sealing of the washer 40 against the valve seat. The valve stem 45 is carried by a piston 46 having a reduced end portion 47 defining a shoulder 47'. The piston is slidably mounted within the upstanding portion 29 with the shoulder 47' abutting the flange 29' when the valve is in closed position, said piston being provided with a plurality of O-rings 48 formed from Viton, silicone or other suitable material, the top and bottom rings functioning as wipers for maintaining the center ring free from dirt and other abrasive substances.

By means of the above described construction and arrangement of the actuating piston 46 and the associated sealing rings 48, the linear thrust exerted by the expansion of the thermosensitive actuator 8 is transmitted to the valve stem 45 whereby the valve 35 is moved to open position. Additionally, an effective seal is provided for the components in the power head housing 3, and the shoulder member 47' provides a stop to limit the upward movement of the piston 46, whereby the piston is always contained within the valve body, and held therein by the biasing action of the return spring 36 which forces the shoulder 47' of the piston against the internal flange 29' on the upstanding portion of the valve body.

The structural arrangement of the stack switch and the electrical circuits controlled thereby will be described in conjunction with the functional relationship between the power head and valve assemblies shown in FIG. 1 wherein, for purposes of illustration, the actuator is shown operatively connected to a valve assembly for controlling the flow of fluid in a heating system. Referring to FIG. 1, the heating system includes a suitable burner, a source of fuel, not shown, and a fluid circulating pump P adapted to be driven by an electric motor M connected to a suitable power source by means of a relay, as shown.

The terminal strip 49 is mounted on the lower portion 4' of the power head housing, said strip having a terminal 50 connected to one of the heater coil leads 51 and to a lead 52, through a room thermostat 53, to a transformer 54, which in turn is connected to a suitable electrical source. The other heater coil lead 55 (FIG. 4) is connected to a leaf 56 of the stack switch 15, which leaf is normally in contact with a leaf 57 connected to a terminal 58 by means of a lead 59 which is also connected to a leaf 60 of the switch, said terminal 58 being connected by means of a common ground line 61 to the relay and through lead 62 to the transformer. A terminal 63 is connected to a leaf 64 of the switch 15 by means of a lead 65, said terminal also being connected to the relay by a lead 66.

In the operation of the improved electrically controlled thermosensitive actuator and associated valve assembly, so far described, actuation of the valve is initiated by an electrical impulse or signal from the room thermostat 53 which impulse passes through the lead 52 to the contact 50 connected to the heating coil lead 51, the circuit to the heating coil being completed through the lead 61 connected to the common ground contact 58. The heating coil is now energized and the heat thus generated causes the plastic fill 8a of the power element 8 to expand which, in turn, overcomes the force of the return spring 36 and opens the valve 35, thus permitting liquid or other medium to flow through the valve orifice or port 34. At a predetermined point in the expansion process, for example at approximately .045", the downward movement of the switch actuating arm 16 carried by the plunger 17 closes the normally opened contacts 60' and 64' of the leaves 60 and 64, respectively, of the stack switch thus energizing the relay through leads 61 and 66 to start the motor M of the circulator pump P. After a further increase in expansion, for example, approximately .150" of the total expansion, contact between the normally closed contacts 56' and 57' of the leads 56 and 57, respectively, is broken, thus de-energizing the heating coil. The power element 8 now cools and the spring 36 returns the stack switch 15 to the point where contact is again made between the normally open pair of contact 60' and 64', whereupon the heating coil is again energized. This process is repeated intermittently until the thermostat is satisfied.

It has been found that the performance times of the improved remote control arrangement, under certain conditions of use, are approximately, two minutes to energize the circular pump upon receiving a signal from the thermostat, and intermittent operations of 45 seconds on and about 2 minutes off, however, it will be understood that the above times may be varied to suit the needs of the particular application.

The thermosensitive actuator 8 is of the type disclosed in my co-pending application Ser. No. 313,885, and comprises a tube of hard copper 8b or other suitable rigid material of superior strength adapted to house a polyethylene rod 8a as the expandable drive element. One end of the rod engages the sealed end of the tube, the opposite end of the rod engages the adjacent end of a push rod or piston 8c, formed from brass or other suitable material; when the actuator 8 is heated, as described hereinabove, the plastic rod expands and forces the push rod or piston outwardly out of the tube, thus causing the valve to open.

Should it become necessary, the power element 8 may be easily and quickly replaced by removing the hex cap 10 with a box wrench or the like, removing the old element and replacing the same with a new one, and then retightening the cap. There are no wires to disconnect, no draining of the heating system or covers to be removed. The only tool required is a box wrench or the like to remove the cap. The power head housing is preferably formed from aluminum or other suitable heat dissipating material, and all housings and valve assemblies are interchangeable.

With reference to the structural arrangement of the valve assembly the return spring 36 is formed from stainless steel or other suitable material, the set thereof being predetermined and the spring characteristics selected in accordance with the desired pressure setting. When the electric heater of the power head assembly is de-energized the spring returns the valve to its normally closed position, and a tight seal through the valve orifice is thereby attained. The cap 37, which threads into the boss 28 of the valve body may be formed from brass, functions as a seal in conjunction with the gasket 38, and as a spring plate for the return spring.

Referring to FIGS. 10–14, there is shown a modification of the present invention wherein the valve is of a normally open, energized closed, type whereby in the event of thermostat, transformer, or other electrical component malfunction, the valve will fail safe in the open position. The power head assembly of the modification is the same as that described hereinabove, except that the stack switch is constructed and arranged whereby both pairs of contacts 56', 57' and 60', 64' (FIG. 11) are normally closed when the valve is in the open position (FIG. 10), said contacts being moved to open position (FIG. 12) when the valve is energized into closed position (FIG. 13). The valve assembly of the modification differs from the previously described arrangement, in that the seat portion 34(b) of the modification is chamfered to enable proper positioning of the valve member 35(a), and an O-ring 48', in conjunction with the valve, provides a water tight closure when the valve is energized to closed position.

The operation of the modified embodiment of the invention is substantially the same as described in connection with the remote control of the normally closed, energized open, valve arrangement of FIGS. 1 and 2, wherein actuation of the valve is initiated by an impulse or signal from a thermostat of the type used with air-conditioning units which sends out an electrical impulse when a preselected medium is exceeded, which impulse passes to the contact 50 connected to the lead 51 (FIGS. 12 and 13) of the heating coil, the lead 55 of the heating coil being connected to the common ground contact 58. The heating coil is now energized and the heat thus generated causes the thermally responsive plastic contained in the power element 8 to expand and thereby push the valve 35(a) downwardly to effect tight sealing closure between the valve head 35(b) and the valve orifice or seat 34(b). At predetermined points in the expansion process the relay and the heating coil are sequentially deenergized, and as the power element cools the spring 36 unseats the valve, and the normally closed contacts of the stack switch are sequentially opened to de-energize the heating coil and the relay. This process is repeated intermittently until the thermostat is satisfied.

While I have shown and described the preferred embodiment of my invention, I wish it to be understood that I do not confine myself to the precise details of construction set forth herein by way of illustration, as it is apparent that changes and variations may be made therein by those skilled in the art, without departing from the spirit of the invention or exceeding the scope of the appended claims.

I claim:

1. In combination, a power head assembly for the remote control of a valve assembly, comprising a housing having an upper portion, and a lower portion including a bottom wall, electrically controlled thermosensitive actuator means mounted within the upper portion of the housing, said actuator means including a power element having one end extending into the lower portion of the housing, said power element incorporating a heat sensitive plastic and a piston, a plunger having one end adapted to receive one end of said piston, the opposite end of the plunger being adapted to slide outwardly of the housing through the bottom wall thereof; switch means positioned within the lower portion of the housing in proximity to said plunger, and a switch actuating arm carried by said plunger, a valve assembly including a valve body and valve actuating means, said plunger being in alignment with said valve actuating means, whereby when the thermosensitive actuator is energized, the heat sensitive plastic expands, thereby moving the plunger outwardly of the housing to cause the switch actuating arm to actuate said switch means and simultaneously cause the plunger to move against the valve actuating means whereby the valve assembly is actuated.

2. The combination of a power head assembly and a valve assembly according to claim 1, wherein a compression spring is mounted between the bottom wall of the housing and the switch actuating arm, whereby when the thermosensitive actuator means is de-energized the plunger is returned to its initial position.

3. The combination of a power head assembly and a valve assembly according to claim 1, wherein the electric heater means comprises, a ceramic core formed with an axial bore, and having a heating coil wound thereon, positioned in the upper portion of said housing, O-ring insulators supporting said core in spaced relation with respect to the inner wall of said housing, the power element being slidably mounted within said bore of the ceramic core.

4. The combination of a power head assembly and a valve assembly according to claim 1 wherein a shoulder is provided on said opposite end of the plunger adapted to engage the bottom wall of the housing and thereby limit the outward movement of the plunger from the housing.

5. The combination of a power head assembly and a valve assembly according to claim 1 wherein, the switch actuating arm is formed with an aperture adapted to slidably receive a bolt member including ahead, said bolt being secured to the bottom wall of the housing, whereby the switch actuating arm abuts the bolt head to thereby limit the movement of the plunger inwardly of the housing.

6. The combination of a power head assembly and a valve assembly according to claim 1 wherein manual control means is mounted on the end of the upper portion of the housing, said control means being connected to the power element, whereby the normal thermal actuation of the power element can be manually duplicated.

7. The combination of a power head assembly and a valve assembly according to claim 6 wherein the manual control means comprises, a cap secured to the end of the upper portion of said housing, a plug threaded into said cap, and a recess formed within said plug; the opposite end of the power element being positioned within said recess, whereby when the plug is turned down into the cap, the power element is moved in the direction of the lower portion of the housing thereby causing the plunger to slide downwardly through the bottom wall of the housing.

8. In combination, a power head assembly for the remote control of a valve assembly comprising a housing, electrically controlled thermosensitive actuator means mounted within said housing, said actuator means including an elongated tubular heat conductive casing closed at one end, a thermally expandable heat sensitive plastic rod received within said casing, piston means extending from the open end of said casing, one end of said piston means contacting said plastic rod, whereby said piston means is moved outwardly of said casing upon expansion of said rod, and electric heating means for said casing including an electric heating element mounted in spaced relationship with said housing and encircling said casing and control means for said heating element, adjusting means for mounting said casing for longitudinal adjusting movement relative to said housing, a valve assembly including a valve housing having an inlet port and an outlet port, a valve seat assembly mounted within said valve housing between said inlet and outlet ports, movable valve closure means mounted within said housing for movement toward and away from engagement with said valve seat assembly to control fluid flow through said valve assembly, biasing means mounted within said valve housing to bias said closure means relative to said valve seat assembly, mounting means to mount said valve assembly below said power head assembly and upon said housing with said valve closure means substantially axially aligned with said piston means, connecting means operating to connect said piston means with said closure means, whereby said biasing means within said valve housing urges said piston means toward said plastic rod, upon expansion thereof, said connecting means operating to cause relative movement between said valve closure means and valve seat assembly upon movement of the piston means outwardly from said tubular casing.

9. The combination of claim 8 wherein manual control means are operatively connected to move said closure means relative to said valve seat assembly whereby thermal remote control of said valve assembly can be manually duplicated.

10. The combination of claim 8 wherein said control means for said heating element includes switch means mounted upon said housing, said switch means including first switch contact means electrically connected between said heating element and a power source and second switch contact means connected between said power source and a controlled unit, and switch actuator means mounted to sequentially operate said switch contact means at predetermined points in the outward movement of said piston means.

11. The combination of claim 10 wherein thermostatic control means are electrically connected between said power source and said switch means for controlling the energization of said heating element.

12. In combination, a power head assembly and a valve assembly for controlling the flow of fluid in a fluid system incorporating an electrically controlled unit comprising a housing, electrically controlled thermosensitive actuator means mounted within said housing, said actuator means comprising a power element incorporating an expandable, heat sensitive plastic and piston means movable in response to the expansion of said plastic, electric heating means for said power element mounted within said housing, a valve assembly for controlling the flow of liquid in the system detachably secured to the power head housing, said valve assembly having valve actuating means operatively connected to the power element, switch means mounted in said power head housing and electrically connected to said heating means and electrically controlled unit, said switch means including a switch actuator mounted to break the circuit to said heating means upon the movement of said piston to a predetermined point and subsequently activate said electrically controlled unit, electrical circuit means including a power source and a thermostat, connected to said electric heating means through said switch means, whereby an electrical impulse from the thermostat energizes the heating means to actuate the valve assembly.

13. A power head assembly of the character described comprising, a housing having an upper portion, and a lower portion including a bottom wall, electrically controlled thermosensitive actuator means mounted within the upper portion of the housing, said actuator means including an electric heater having a ceramic core formed with an axial bore and having a heating coil wound thereon positioned in the upper portion of said housing, insulators supporting said core in spaced relation with respect to the inner wall of said housing, a power element slidably mounted within the bore of said ceramic core and having one end extending into the lower portion of the housing, said power element incorporating a heat sensitive plastic and a piston, a plunger having one end adapted to receive one end of said piston, the opposite end of the plunger being adapted to slide outwardly of the housing through the bottom wall thereof; switch means positioned within the lower portion of the housing in proximity to said plunger, and a switch actuating arm carried by said plunger, whereby when the thermosensitive actuator is energized, the heat sensitive plastic expands moving the plunger outwardly of the housing while simultaneously causing the switch actuating arm to actuate said switch means.

14. A power head assembly according to claim 13, wherein manual control means is mounted on the end of the upper portion of the housing, said control means being connected to the power element, whereby the normal thermal actuation of the power element can be manually duplicated.

15. A power head assembly according to claim 14, wherein the manual control means comprises, a cap secured to the end of the upper portion of said housing, a plug threaded into said cap, and a recess formed within said plug; the opposite end of the power element being positioned within said recess, whereby when the plug is turned down into the cap, the power element is moved in the direction of the lower portion of the housing thereby causing the plunger to slide downwardly through the bottom wall of the housing.

16. In combination, a power head assembly and a valve assembly for controlling the flow of fluid in a heating system incorporating a motor driven pump, comprising a housing, electrically controlled thermosensitive actuator means mounted within said housing, said actuator means comprising a power element incorporating an expandable, heat sensitive plastic; electric heating means comprising a ceramic core formed with an axial bore and having a heating coil wound thereon, said power element being slidably mounted within the axial bore, a valve assembly for controlling the flow of liquid in the heating system detachably secured to the power head housing, said valve assembly having valve actuating means operatively connected to the power element, switch means mounted in said power head housing, and electrically connected to the heating coil, electrical circuit means, including a power source, a thermostat, and a relay connected to the thermosensitive actuator and to the motor driven pump of the heating system through said switch means, whereby an electrical impulse from the thermostat energizes the power element, and thereby sequentially actuates the valve assembly and the heating system pump.

References Cited by the Examiner
UNITED STATES PATENTS

| | | | |
|---|---|---|---|
| 1,225,887 | 5/1917 | Swan | 251—11 |
| 1,501,932 | 7/1924 | Wilson. | |
| 1,742,091 | 12/1929 | Otto | 236—68 |

(Other references on following page)

UNITED STATES PATENTS

| | | | |
|---|---|---|---|
| 1,844,071 | 2/1932 | Newell | 251—11 |
| 1,890,909 | 12/1932 | Lincoln. | |
| 1,901,070 | 3/1933 | Williams | 251—11 |
| 2,030,932 | 2/1936 | Persons | 60—23 |
| 2,122,050 | 6/1938 | Stuart | 60—23 X |
| 2,172,079 | 9/1939 | Boehm | 251—321 |
| 2,211,573 | 8/1940 | McGrath | 237—8 |
| 2,271,307 | 1/1942 | Ray | 60—23 |
| 2,384,977 | 9/1945 | Swearingen | 251—321 |
| 2,489,896 | 11/1949 | Kempton | 236—68 X |
| 2,490,932 | 12/1949 | Thuney | 237—8 |
| 2,517,061 | 8/1950 | Stackelberg. | |
| 2,990,716 | 7/1961 | Butts | 60—23 X |
| 3,019,986 | 2/1962 | Schoerner | 236—12 |
| 3,168,805 | 2/1965 | Fleury | 60—25 |

ALDEN D. STEWART, *Primary Examiner.*